Patented Mar. 2, 1954

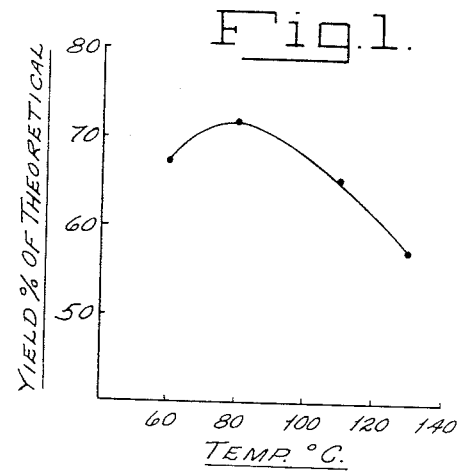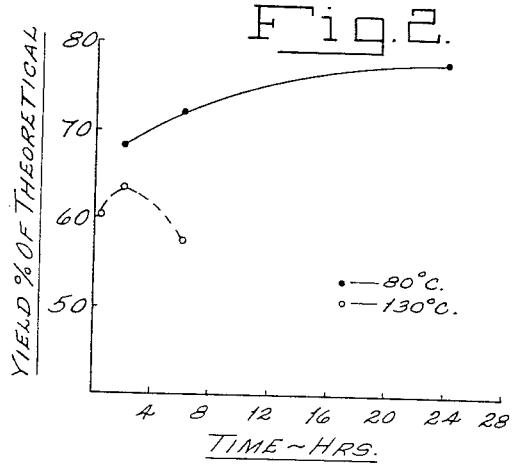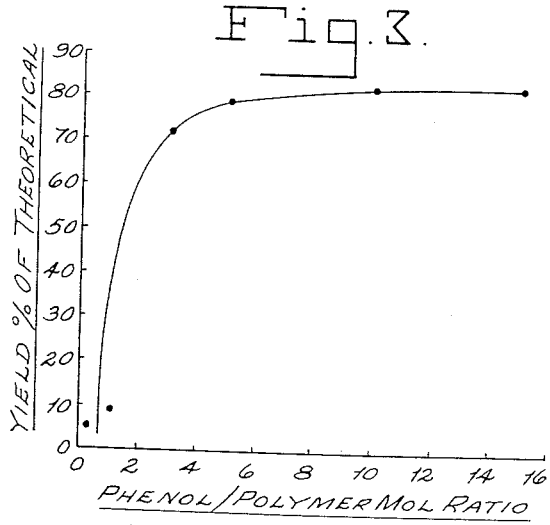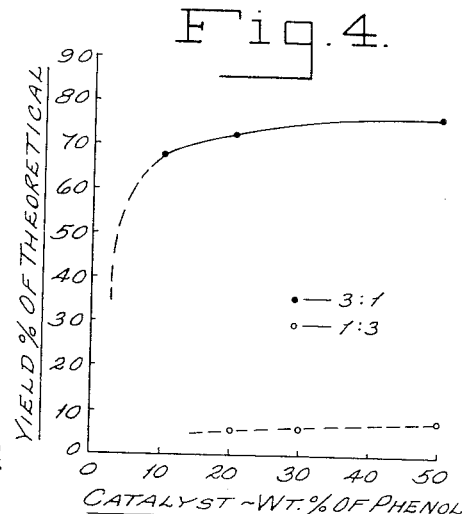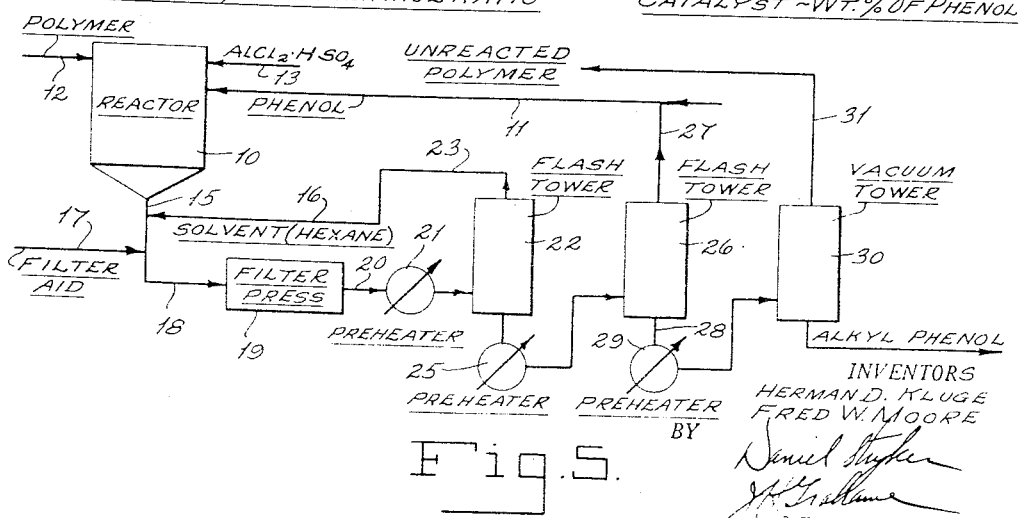

2,671,117

UNITED STATES PATENT OFFICE 2,671,117

HYDROXY AROMATIC HYDROCARBON-OLEFIN POLYMER ALKYLATION WITH $AlCl_2 \cdot HSO_4$ CATALYST Herman D. Kluge, Wappingers Falls, and Fred W. Moore, Fishkill, N. Y., assignors to The Texas Company, New York, N. Y., a corporation of Delaware Application February 11, 1950, Serial No. 143,782

4 Claims. (Cl. 260—624)

This invention relates to the manufacture of high molecular weight alkylated hydroxy aromatic compounds, such as alkyl phenols, by the alkylation of a hydroxy aromatic hydrocarbon with an olefin polymer having 16 to 30 carbon atoms in the molecule in the presence of $AlCl_2 \cdot HSO_4$ catalyst.

Alkylated hydroxy aromatic compounds, such as alkyl phenols, having one or more high molecular weight alkyl side chains, are valuable intermediates in the preparation of lubricating oil additives and sulfonated detergents. The alkyl phenols of the present invention are particularly useful in the preparation of magnesium and zinc alkyl phenolates employed as lubricating oil additives as disclosed and claimed in the copending application of Frederic C. McCoy, Bill L. Benge, Edwin C. Knowles and Charles C. Towne, Serial No. 143,836, filed of even date herewith, and now abandoned.

The use of conventional alkylation catalysts, such as sulfuric acid and aluminum chloride, has not proved attractive for the alkylation of phenols with olefin polymers having 16 to 30 carbon atoms in the molecule, since low yields of the order of 20–35% by weight on the basis of theoretical are obtained, and the resulting alkyl phenol products have given metallic alkyl phenolates of inferior quality as lubricating oil additives.

One of the principal objects of the present invention is to provide an improved process of alkylating a hydroxy aromatic hydrocarbon, such as a phenol, with a high molecular weight olefin polymer of this character in order to produce alkylated products with high molecular weight alkyl side chains in good yield and of satisfactory quality for the preparation of metallic alkyl phenolate additives and other uses.

Other objects and advantages of the present invention will be apparent from the following description taken in conjunction with the attached drawing and appendant claims.

In the attached drawing, Figs. 1–4 are plots illustrating critical operating conditions for carrying out the alkylation reaction in accordance with the present invention; and Fig. 5 is a diagrammatic view of apparatus suitable for carrying out the alkylation method.

It has now been discovered that a complex alkylation catalyst prepared by reacting equal molar quantities of sulfuric acid and anhydrous aluminum chloride at elevated temperatures below 120° C., said catalyst having the formula $AlCl_2 \cdot HSO_4$, constitutes an unusually effective catalyst for carrying out this hydroxy aromatic hydrocarbon-olefin polymer alkylation reaction when certain critical conditions of operation are employed. The critical conditions include a temperature of about 60–100° C., preferably about 80° C.; a phenol or other hydroxy aromatic hydrocarbon to olefin polymer mol ratio in the reacting mix of about 2:1 to 6:1, preferably about 3:1; a phenol or other hydroxy aromatic hydrocarbon to catalyst weight ratio of about 1:0.1 to 1:0.3, preferably about 1:0.2; and a reaction time of about 2–12 hours, preferably about 6 hours. Under these conditions, yields of high quality alkylated product of the order of 65–80% or more of theoretical are readily obtained. Since the catalyst is a solid which does not readily form a separate phase on settling of the reaction mix, the resulting reaction product may be treated for catalyst removal by either hydrolysis with an aqueous mineral acid, preferably HCl, or by mixing with a solid filter-aid material in the presence of a hydrocarbon solvent followed by filtering. Where a product of high purity is desired, the former procedure is preferred. The excess unreacted phenol can be removed from the catalyst-free product by water washing, which further reduces the content of impurities, or by distillation. The final alkylated product is obtained as the residue of high vacuum distillation at 1–2 mms. mercury absolute pressure up to a temperature about 50° C. higher than the end boiling point of the olefin polymer employed.

Any suitable hydroxy aromatic hydrocarbon can be employed as a starting material for purposes of the present invention. The preferred material from the standpoint of producing an intermediate for lubricating oil additive manufacture is a mononuclear monohydroxy aromatic hydrocarbon, such as phenol, cresol, xylenol, or other alkyl phenol. Also, mononuclear polyhydroxy aromatic hydrocarbons, such as hydroquinone, pyrogallol, and other dihydric and trihydric phenols, can be employed. All of the foregoing mononuclear hydroxy aromatic hydrocarbons are generically referred to herein as "phenols." Likewise, polynuclear hydroxy aromatic hydrocarbons, such as the naphthols, can be used. From the standpoints of availability and economy, simple phenol is preferred. For the purpose of ease in description, phenol will be referred to in the following text; but it is to be understood that this is merely by way of example, and that the description applies to the other hydroxy aromatic hydrocarbons specified.

The olefin polymer having 16 to 30 carbon atoms in the molecule employed as a starting material is preferably a propylene polymer, although butylene polymer or a polymer of other low molecular weight olefin may be used. A very satisfactory method of preparing the propylene polymer is to polymerize propylene under pressure in the presence of a $BF_3 \cdot H_2O$ catalyst at a temperature of about 150° F., since this has been found to give a good yield of polymer in the $C_{16}$–$C_{30}$, and preferably $C_{18}$–$C_{26}$, range without excessive heavy polymer formation. $BF_3 \cdot H_2O$ catalyst is prepared by saturating water with $BF_3$ by bubbling the $BF_3$ gas into the water in a vessel until no more of the gas will go into solution, as evidenced by the increased "fog" of escaping gas, or by use of a counter-current gas absorption tower held at about 8 mm. Hg pressure.

In the preparation of the polymer, a steel reactor equipped with a motor driven stirrer and heating jacket is conveniently employed. The reactor is first charged with the desired amount of boron trifluoride-water catalyst, which is usually of the order of around 5–15% and preferably around 10% by weight of the propylene to be added. With heated water being circulated through the jacket of the reactor at a temperature of about 150° F., the propylene is fed into the reactor with stirring at a feeding pressure of approximately 100 pounds per square inch. Polymerization starts rapidly and the pressure in the reactor soon drops. The stirring is continued for the desired contact time, usually about two hours. The reactor is then drained, and the reaction mixture allowed to settle into an upper hydrocarbon layer and a lower catalyst layer. The hydrocarbon layer is then washed with an alkaline solution, such as an aqueous sodium carbonate solution, until the wash layer remains strongly alkaline. The hydrocarbon product is then dried with anhydrous calcium chloride and filtered, using a filter-aid. After stabilizing on a steam bath, the resulting polymer may be fractionated under an absolute pressure of 1–2 mm. of mercury into cuts boiling between 100° and 220° C. of the desired average carbon atom content to obtain the propylene polymer employed as a charge for the present alkylation reaction. Typical cuts and yields of propylene polymer obtained by the foregoing procedure are set forth in the following tabulation:

TABLE I

| Boiling Range (1–2 mm. Hg) | Volume Percent of Charge |
| --- | --- |
| 100–120° C | 7.2 |
| 120–140° C | 7.2 |
| 140–160° C | 8.1 |
| 160–180° C | 10.0 |
| 180–200° C | 7.9 |
| 200–220° C | 6.0 |
| Residue above 220° C | 12.0 |

Typical tests with respect to average carbon atom content and average molecular weight of the preferred cuts of propylene polymer are set forth in the following tabulation:

TABLE II

| Boiling Range, ° C. | Average No. of Carbon Atoms | Average Molecular Weight |
| --- | --- | --- |
| 100–120 | 18 | 252 |
| 120–140 | 20 | 280 |
| 140–160 | 23 | 322 |
| 160–180 | 26 | 364 |

It will be understood that broader or narrower cuts than the foregoing can be employed, if desired. In fact, a broad boiling range polymer fraction containing polymers having 16 to 30 carbon atoms in the molecule can be used. However, from the standpoint of product control and product quality as an intermediate in the preparation of metal alkyl phenolates for lubricating oil additives, it is generally preferred to utilize one of the cuts as listed above. Cuts of polymer bottoms from the conventional selective or non-selective polymerization of $C_3$ or $C_3$–$C_4$ olefinic hydrocarbon charging stock in the presence of supported phosphoric acid type catalysts, which cuts fall within the foregoing distillation range, are also suitable starting materials.

In the preparation of the catalyst for the present alkylation reaction, sulfuric acid of from 90 to 100% concentration, preferably about 95–98%, is reacted with one molecular proportion of anhydrous aluminum chloride at a temperature of about 80° C., with the liberation of one mol of HCl. The reaction is exothermic and care is taken to prevent the temperature from rising above 120° C., as otherwise an additional mol or HCl may be driven off producing a material of lower alkylating ability analyzing to $AlCl \cdot SO_4$. Also, where the catalyst is prepared by reacting the anhydrous aluminum chloride with an excess over the mol ratio of sulfuric acid, a catalyst of lower alkylating ability is again secured. This is illustrated in the following tabulation, which sets forth the results secured in the alkylation of phenol with $C_{20}$ butylene polymer under comparable conditions (except as hereinafter explained) with these various catalyst compositions:

TABLE III

| Catalyst Composition | Yield of Alkyl Phenol, Percent |
| --- | --- |
| 1. $AlCl_2 \cdot HSO_4$ | 43 |
| 2. $AlCl_2 \cdot HSO_4$ (excess sulfate) | 10 |
| 3. $AlCl \cdot SO_4$ | 33 |

In the foregoing tabulation, all three runs were made at a temperature of about 80° C. with a reaction time of 24 hours, and about 20% by weight of catalyst based on phenol. Run 3 with $AlCl \cdot SO_4$ employed an optimum phenol/olefin mol ratio of 3:1; whereas runs 1 and 2 were made at a phenol/olefin mol ratio of 1:1. Thus, even under optimum conditions, the $AlCl \cdot SO_4$ is markedly inferior to the $AlCl_2 \cdot HSO_4$ catalyst of the present invention.

Even with the $AlCl_2 \cdot HSO_4$ catalyst, it is found essential to employ a substantial proportion of catalyst to reactants. This is illustrated in the following tabulation, which sets forth the results secured in phenol-$C_{20}$ butylene polymer alkylation at about 80° C., a reaction time of 24 hours and a phenol/polymer mol ratio of 1:1, with different catalyst ratios expressed as grams of catalyst employed per mol of olefin.

TABLE IV

| Catalyst/Olefin Ratio, Grams/Mol | Yield Alkyl Phenol, Percent |
|---|---|
| 18.8 | 0 |
| 56.4 | 43 |

The following examples are given in order to illustrate preferred embodiments of the present invention:

EXAMPLE 1

*Preparation of catalyst*

684 grams of anhydrous aluminum chloride were placed in a 3-liter beaker and warmed on a steam bath to about 35° C. (95° F.). The beaker was removed from the bath and 529 grams of 95% sulfuric acid were added in three portions with stirring between the additions. The beaker was placed back on the steam bath and stirred continuously until the temperature reached 60–70° C. (140–158° F.). At this temperature the beaker was removed and placed in a pan or evaporating dish immersed in cold water to prevent a temperature rise above about 100–110° C. (212–230° F.) in the ensuing reaction. Stirring continued until the copious evolution of HCl had subsided. The dry product was then pulverized to a powder by grinding. A yield of approximately 1,000 grams of the $AlCl_2 \cdot HSO_4$ catalyst resulted. This catalyst was protected from the atmosphere by storing in bottles equipped with drying tubes until employed for the alkylation reaction.

EXAMPLE 2

*Phenol-olefin polymer alkylation*

141 grams (1½ mols) of phenol, reagent grade, were charged to one liter reactor fitted with a stainless steel stirrer. 28.2 grams (20% of the phenol by weight) of $AlCl_2 \cdot HSO_4$ catalyst were also added. The phenol and catalyst were heated to 60° C. (140° F.), the stirrer was started, and 126 grams (½ mol) of propylene polymer (boiling range 100–120° C. at 1.5 mm.) was added slowly (almost dropwise) while maintaining the temperature of 60° C. The temperature was then raised to 80° C. (176° F.) ± 5° C. and stirring was continued for six hours.

At the end of the alkylation period, heating was discontinued and 150 mls. of dilute hydrochloric acid (1:1) were added slowly to hydrolyze the catalyst. The mixture was transferred from the reactor to a settling vessel and the acid layer withdrawn. The excess and unreacted phenol was then removed from the organic layer by washing with very hot water 8 to 10 times.

The crude product was then transferred to a heated vessel equipped with a stirrer, heater and reflux condenser. 100 mls. of 95% ethyl alcohol and 50 grams of a 50% aqueous solution of sodium hydroxide were added, and the temperature raised to alcohol reflux for the removal of further impurities. Refluxing was continued for about four hours, with removal of about one-half of the alcohol through the trap of the reflux condenser. The heat was removed and the contents of the flask cooled to room temperature. 65 mls. of concentrated hydrochloric acid were then carefully added. The NaCl formed by the neutralization of the caustic was dissolved by the addition of 200–300 mls. of water. The mixture was transferred to a separating vessel and the salt water layer was withdrawn.

The crude alkyl phenol was again washed with water, about 250 mls. of ethyl ether being also added to extract the product and help break the resulting emulsion. Water washing was continued until the separated wash water showed neutral to Congo red. The ether was then evaporated on a steam hot plate and heating on the hot plate was continued until no water remained in the product. The crude product was then transferred to a vacuum still and topped to 160° C. at 1.5 mls. Hg absolute pressure. A residue of 124 grams of the purified alkyl phenol was obtained, which analyzed to a molecular weight of 310.5 and an OH number of 156.5.

A series of batch runs utilizing the same charge stocks and the same procedure as outlined immediately above, except that conditions of temperature, reaction time, phenol to polymer mol ratio and phenol to catalyst weight ratio were varied, were made with the results as shown in the following Table V:

TABLE V

| Run | Temp., °C. | Time, Hours | Phenol/Polymer, Mol Ratio | Catalyst, Wt. Percent of Phenol | Yield, Wt. Percent of Theoretical |
|---|---|---|---|---|---|
| 1 | 60 | 6 | 3:1 | 20 | 67.3 |
| 2 | 80 | 6 | 3:1 | 20 | 71.8 |
| 3 | 110 | 6 | 3:1 | 20 | 65.4 |
| 4 | 130 | 6 | 3:1 | 20 | 56.6 |
| 5 | 80 | 2 | 3:1 | 20 | 68.0 |
| 6 | 80 | 24 | 3:1 | 20 | 77.5 |
| 7 | 130 | 2 | 3:1 | 20 | 63.4 |
| 8 | 130 | ½ | 3:1 | 20 | 60.1 |
| 9 | 80 | 6 | 1:1 | 20 | 8.6 |
| 10 | 80 | 6 | 1:3 | 20 | 5.8 |
| 11 | 80 | 6 | 5:1 | 20 | 78.6 |
| 12 | 80 | 6 | 10:1 | 20 | 82.1 |
| 13 | 80 | 6 | 15:1 | 20 | 82.4 |
| 14 | 80 | 6 | 3:1 | 50 | 77.0 |
| 15 | 80 | 6 | 3:1 | 10 | 67.9 |
| 16 | 80 | 6 | 1:3 | 30 | 6.1 |
| 17 | 80 | 6 | 1:3 | 50 | 7.6 |
| 18 | 130 | 24 | 3:1 | 0 | 0 |

Run 2 of Table V is the run of the foregoing Example 2. Runs 1, 2, 3 and 4 are plotted in Fig. 1 of the drawing to more clearly illustrate the effect of temperature on the yield, with other conditions being close to optimum. As shown, a temperature range of about 60–100° C. is required to produce yields in excess of 65% of theoretical, with the curve reaching a peak at about 80° C.

Runs 5, 2 and 6 are plotted in the solid curve of Fig. 2 of the drawing to illustrate the effect of time of reaction on the yield, with other conditions being close to optimum. As shown, the yield progressively rises with increasing time of reaction, with yields being well above 65% of theoretical for reaction times of about 2 to 24 hours. From the practical standpoint, a reaction time in excess of about 12 hours does not appear justified by the small increase in yield, and around 6 hours is considered to be optimum. Runs 8, 7 and 4 are plotted in the dotted line curve of Fig. 2 to illustrate the effect of reaction time at an unduly high temperature of 130° C. In this case, the yields invariably fall below 65%, with the curve breaking sharply on either side of about 2 hours reaction time. This is further illustration of the fact that a temperature of 130° C. is too high for satisfactory results.

Runs 10, 9, 2, 11, 12 and 13 are plotted in Fig. 3 of the drawing, illustrating the effect of phenol to polymer mol ratio on yield, with other conditions approaching optimum. As shown, the curve rises sharply to a phenol to polymer mol ratio of about 2:1, and then breaks to a slow progressive rise between about 3:1 and 15:1. From a practical standpoint, including the necessity for handling and removing the excess unreacted phenol, it appears that ratios in excess of about 6:1 are not justified by the small gain in yield thus obtained. On the same basis, a ratio of about 3:1 is considered optimum.

Runs 15, 2 and 14 are plotted in the solid line curve of Fig. 4 of the drawing. These show the important effect of the phenol to catalyst weight ratio on the yield. The dotted line portion of the solid curve is postulated from the data given in the preceding Table IV, since it is known that the yield drops very sharply with less than about 10% by weight of catalyst on the basis of the phenol employed. The curve rises rather steeply between 10 and 20% catalyst weight and then tapers off to a very slow rise up to 50%. From the practical standpoint, a catalyst weight above about 30% on the basis of the phenol does not appear to be justified, and about 20% by weight appears optimum. Runs 10, 16 and 17 are plotted in the dotted line curve of Fig. 4 for the different phenol to polymer mol ratio of 1:3. These illustrate the fact that this phenol to polymer mol ratio is far below the effective range; and under this condition variation in the weight ratio of phenol to catalyst has little effect. Run 18 of Table V illustrates the fact that this reaction is truly catalytic, since no yield of alkyl phenol was obtained in the absence of the catalyst even at the high temperature of 130° C. and with a longer reaction time.

An alternate procedure for carrying out the alkylation reaction and the recovery of the purified product is illustrated in Fig. 5 of the drawing. This is a shorter procedure, eliminating the water washing and caustic refluxing steps, and can be employed where a highly purified final product is not required.

Referring to Fig. 5, the reactor is illustrated at 10 with phenol charge line 11, polymer charge line 12 and catalyst make-up line 13. The alkylation reaction can be carried out in batch procedure in the manner previously described, or it can be carried out continuously by utilizing a reactor of the external or internal recirculating type having a small stream draw-off 15 in accordance with the rate of fresh feed, so as to provide the desired average reaction time as previously indicated. In either case, the discharged reaction mix from line 15 is mixed with a substantial volume of hydrocarbon solvent, such as hexane, from the line 16 and then with a solid filter-aid material, such as diatomaceous earth, from line 17. A quantity of the hydrocarbon solvent from about equal up to double the volume of phenol, with a weight of filter-aid material of about 20-50% of the weight of the phenol, appears satisfactory for this filtration method of removing the catalyst. The discharged stream of reaction mix in line 15 is first cooled by a suitable cooler (not shown) from the reaction temperature to about 40-50° C. before being mixed with the light solvent and filter-aid. The resulting mixture is then passed by line 18 to filter press 19 where the catalyst and filter-aid are removed.

The filtrate is then passed by the line 20 through preheater 21 to flash tower 22, where the low boiling hydrocarbon solvent is flashed off by line 23 to a condenser (not shown) for recycling by line 16. The bottoms from flash tower 22 passes by line 24 through preheater 25 to flash tower 26, where the excess unreacted phenol is flashed off by line 27 for condensation and recycling by line 11. The crude alkyl phenol bottoms then passes by line 28 through preheater 29 to a final vacuum tower 30, where unreacted polymer and other lower boiling material is distilled off by overhead line 31, and the alkyl phenol product is removed as residue by the bottom line from tower 30.

EXAMPLE 3

*Alkylation by filtration method*

141 grams (1½ mols) of anhydrous phenol, together with 28.2 grams (20% by weight of phenol) of AlCl₂·HSO₄ catalyst were added to the reactor and heated to 60° C. (140° F.). The stirrer was started and 128 grams (½ mol) of a propylene polymer (boiling range 150–158° C. at 1.5 mm. Hg) were added slowly while maintaining the temperature at 60° C. The temperature was then raised to 80° C. (176° F.) ±5° C. and stirring continued for six hours.

At the end of the alkylation period, the heat was removed, and the reaction mix was cooled to 40–50° C. 300 ccs. of mixed hexanes were then added, together with about 40 grams of a filter-aid material known as "Filter-cel." The resulting mixture was then filtered through a thin layer of the filter-aid material backed up by canvas, and the filter cake was washed with hexane until the filtrate was clear.

The resulting filtrate was evaporated on a hot plate to remove the hexane and most of the excess phenol. The residue was then transferred to a vacuum still and topped to 170° C. at 1.5 mm. mercury absolute pressure. 77.9 grams of alkyl phenol were obtained which analyzed to an OH number of 130 and a molecular weight of 256.

Analyses of additional batches of alkyl phenols prepared by above hydrolysis, water washing and caustic reflux method of Example 2, and by the filtration method of Example 3, showed the following results:

TABLE VI

| Procedure | Yield, percent of Theory | Impurities, percent | | | Ash, percent |
| --- | --- | --- | --- | --- | --- |
| | | Sulfur | Chlorine | Aluminum | |
| Hydrolysis, water wash and caustic reflux | 71.8 | 0.00 | 0.09 | 0.01 | 0.006 |
| Filtration | 74.8 | 0.20 | 0.14 | 0.27 | 0.536 |

It will be noted that the filtration method produces a somewhat higher yield, since the water washing step apparently removes a small amount of the alkyl phenol. However, the water washing and alcoholic caustic reflux procedure results in a substantial reduction in impurities in the final alkyl phenol product.

To further investigate alternate procedures for working up the product following the alkylation reaction, additional runs were made under the optimum reaction conditions. In one case, the procedure employed was the same as in Example 2 involving the hydrolysis and water washing steps, but the alcoholic caustic reflux step was omitted. In a second case the hydrolysis step of Example 2 was employed but both the water washing and caustic reflux steps were then omitted and the product worked up by distillation. In a third case the filtration method of Example 3 was employed. Results with respect to yield of product and analysis for impurities in the resulting alkyl phenol products are set forth in the following Table VII:

TABLE VII

| Catalyst Removal | Phenol Removal | Yield, Percent | Impurities, percent | |
|---|---|---|---|---|
| | | | Sulfur | Chlorine |
| Hydrolysis | Hot water | 72.5 | 0.00 | 0.00 |
| Do | Distillation | 75.0 | 0.06 | 0.00 |
| Filtration | do | 74.0 | 0.12 | 0.14 |

From the foregoing results, it is apparent that the caustic reflux step can be omitted from the procedure of Example 2 and a highly purified product in somewhat better yield still obtained. Where a product of intermediate purity content is satisfactory, both the water washing and caustic refluxing treatments of Example 2 can be omitted, and the hydrolysis of the catalyst followed directly by distillation to obtain a high yield. Where a product with a rather high ash content with appreciable quantities of sulfur, chlorine and aluminum impurities is satisfactory, the simpler filtration method is preferred and provides high yields.

While the $AlCl_2 \cdot HSO_4$ catalyst has heretofore been suggested for the alkylation of aromatic hydrocarbons with low molecular weight olefins, its use for the alkylation of hydroxy aromatic compounds has not been disclosed. The conditions heretofore suggested for the alkylation of aromatic hydrocarbons with low molecular weight olefins are entirely unsuitable for the present reaction. Moreover, it was not to be anticipated that this catalyst would prove markedly superior for the phenol-high molecular weight olefin polymer alkylation reaction when carried out under the critical conditions herein disclosed.

Obviously many modifications and variations of the invention, as hereinbefore set forth, may be made without departing from the spirit and scope thereof, and therefore only such limitations should be imposed as are indicated in the appended claims.

We claim:

1. The method of manufacturing a high molecular weight alkyl phenol, which comprises alkylating a phenol with propylene polymer having 18 to 26 carbon atoms in the molecule in the presence of $AlCl_2 \cdot HSO_4$ catalyst at a temperature of 60-100° C., a phenol/polymer mol ratio in the reacting mix of about 2:1 to 6:1, a phenol/catalyst weight ratio of about 1:0.1 to 1:0.3, and a reaction time of about 4-12 hours.

2. The method according to claim 1, wherein the temperature is about 80° C., the phenol/polymer mol ratio is about 3:1, the phenol/catalyst weight ratio is about 1:0.2, and the reaction time is about 6 hours.

3. The method of manufacturing a high molecular weight alkyl phenol, which comprises heating a mixture of phenol with about 10-30% by weight of $AlCl_2 \cdot HSO_4$ catalyst at a temperature of about 60° C., then while agitating the mixture at this temperature slowly adding an olefin polymer having 16 to 30 carbon atoms and formed by polymerization of an olefin selected from the group consisting of propylene, $C_4$ olefins and mixtures thereof in the molecule until the mol ratio of phenol to added polymer is about 2:1 to 6:1, and finally agitating the mix at a higher temperature of about 80° C. for a period of at least about 6 hours to complete the reaction.

4. The method of manufacturing a high molecular weight alkyl phenol, which comprises alkylating a phenol with an olefin polymer having 16 to 30 carbon atoms in the molecule and formed by polymerization of an olefin selected from the group consisting of propylene, $C_4$ olefins and mixtures thereof in the presence of $AlCl_2 \cdot HSO_4$ catalyst at a temperature of 60-100° C., a phenol/polymer mol ratio in the reacting mix of about 2:1 to 6:1, a phenol/catalyst weight ratio of about 1:0.1 to 1:0.3, and a reaction time of about 2-12 hours, and separating as the principal reaction product an alkylated phenol in which an alkyl substituent on the benzene nucleus contains from 16 to 30 carbon atoms.

HERMAN D. KLUGE.
FRED W. MOORE.

References Cited in the file of this patent

UNITED STATES PATENTS

| Number | Name | Date |
|---|---|---|
| 2,008,032 | Niederl | July 16, 1935 |
| 2,193,760 | Oreisbach et al. | Mar. 12, 1940 |
| 2,233,408 | Flett | Mar. 4, 1941 |
| 2,369,691 | Schmerling et al. | Feb. 20, 1945 |
| 2,430,190 | Schmerling et al. | Nov. 4, 1947 |
| 2,480,254 | Mavity | Aug. 30, 1949 |